(12) United States Patent
Schaenzer et al.

(10) Patent No.: US 6,563,785 B2
(45) Date of Patent: May 13, 2003

(54) METHOD OF MANUFACTURING ROUNDED EDGE RECORDING HEAD

(75) Inventors: Mark J. Schaenzer, Eagan, MN (US);
Phillip E. Gorka, Burnsville, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/829,285

(22) Filed: Apr. 9, 2001

(65) Prior Publication Data

US 2001/0043559 A1 Nov. 22, 2001

Related U.S. Application Data

(62) Division of application No. 09/143,752, filed on Aug. 31, 1998, now abandoned.
(60) Provisional application No. 60/069,478, filed on Dec. 15, 1997.

(51) Int. Cl.⁷ .............................................. G11B 5/127
(52) U.S. Cl. ..................... 369/300; 29/603.01
(58) Field of Search .............................. 369/300, 44.15; 360/236.5, 235.1, 234.3, 99.01; 29/603.12, 603.14, 603.01; 83/692, 857

(56) References Cited

U.S. PATENT DOCUMENTS

| | | | |
|---|---|---|---|
| 3,678,482 A | 7/1972 | Billawala | 340/174.1 E |
| 4,285,019 A | 8/1981 | Scott et al. | 360/103 |
| 4,420,780 A | 12/1983 | Deckert | 360/103 |
| 4,870,519 A | 9/1989 | White | 360/103 |
| 4,870,521 A | 9/1989 | Okabayashi | 360/103 |
| 4,912,582 A * | 3/1990 | Gomi et al. | 360/236.4 |
| 5,299,079 A | 3/1994 | Kuroda | 360/103 |
| 5,321,882 A * | 6/1994 | Zarouri et al. | 29/423 |
| 5,404,256 A | 4/1995 | White | 360/103 |
| 5,406,694 A * | 4/1995 | Ruiz | 29/423 |
| 5,429,544 A * | 7/1995 | Hasegawa et al. | 451/226 |
| 5,467,237 A | 11/1995 | Takahashi | 360/114 |
| RE35,477 E * | 3/1997 | Hussinger et al. | 29/423 |
| 5,634,259 A * | 6/1997 | Sone et al. | 29/603.12 |
| 5,635,082 A * | 6/1997 | Yamamoto et al. | 204/192.2 |
| 5,796,706 A | 8/1998 | Shintani et al. | 369/126 |
| 5,828,644 A | 10/1998 | Gage et al. | 369/112 |
| 5,881,042 A | 3/1999 | Knight | 369/99 |
| 6,067,207 A | 5/2000 | Kurita | 360/105 |
| 6,142,199 A * | 11/2000 | Schibline | 144/134.1 |
| 6,182,546 B1 * | 2/2001 | Hecker | 83/365 |
| 6,334,808 B1 * | 1/2002 | Tanaka | 451/42 |
| 2001/0008154 A1 * | 7/2001 | Guldi et al. | 148/33.2 |

FOREIGN PATENT DOCUMENTS

| | | | |
|---|---|---|---|
| JP | 62-24489 | | 2/1987 |
| JP | 09073606 A | * | 3/1997 |
| JP | 2000107999 A | * | 4/2000 |

* cited by examiner

Primary Examiner—Hoa T. Nguyen
Assistant Examiner—Tanjie Chen
(74) Attorney, Agent, or Firm—Theodore M. Magee; Westman, Champlin & Kelly, P.A.

(57) ABSTRACT

A slider that carries a transducer in a storage device having a moving storage medium, includes a leading end, a trailing end, and a top area extending from the leading end to the trailing end. The top area is designed to face substantially away from the storage medium, while a bottom area of the slider, extending from the leading end to the trailing end, is designed to substantially face toward the storage medium. The bottom area is joined to the trailing end by a curved surface having a substantially constant radius of curvature from the trailing end to a point at least 0.025 millimeters away from the trailing end.

10 Claims, 6 Drawing Sheets

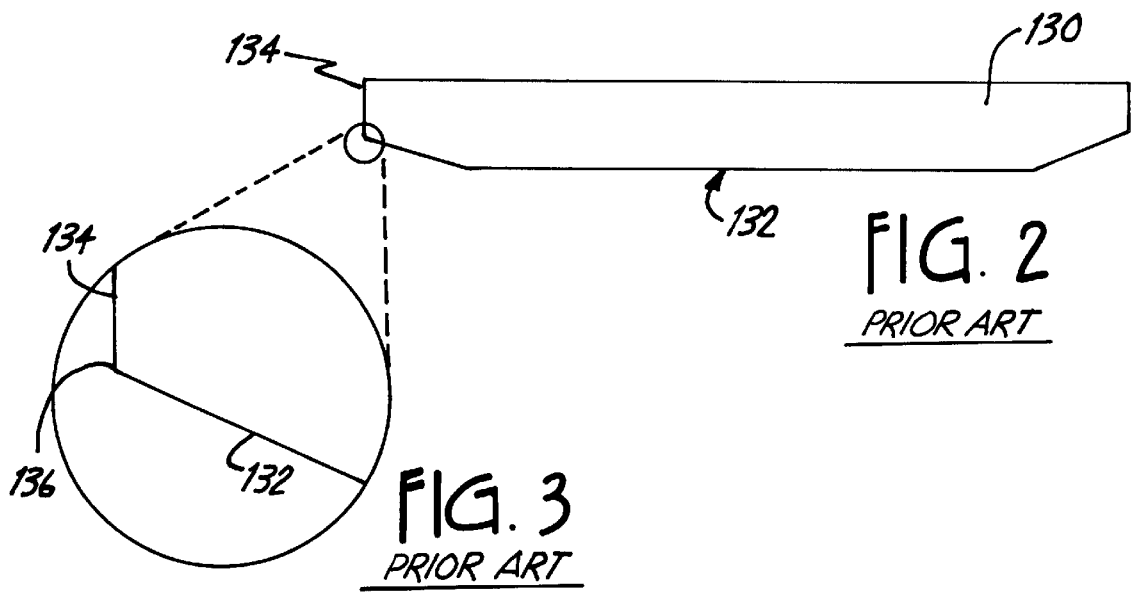
FIG. 2 PRIOR ART
FIG. 3 PRIOR ART
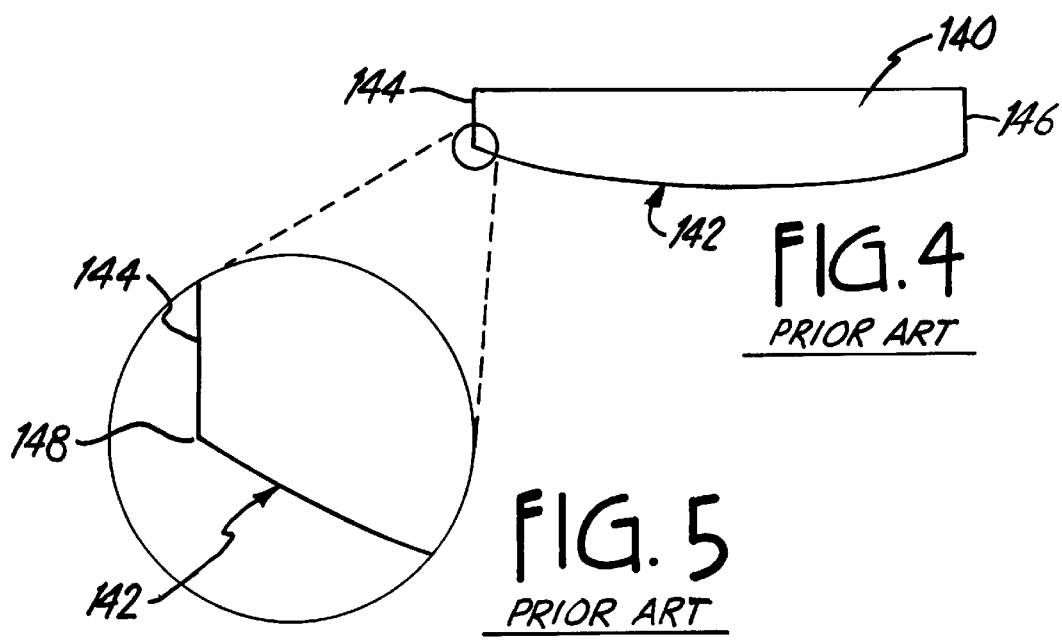
FIG. 4 PRIOR ART
FIG. 5 PRIOR ART

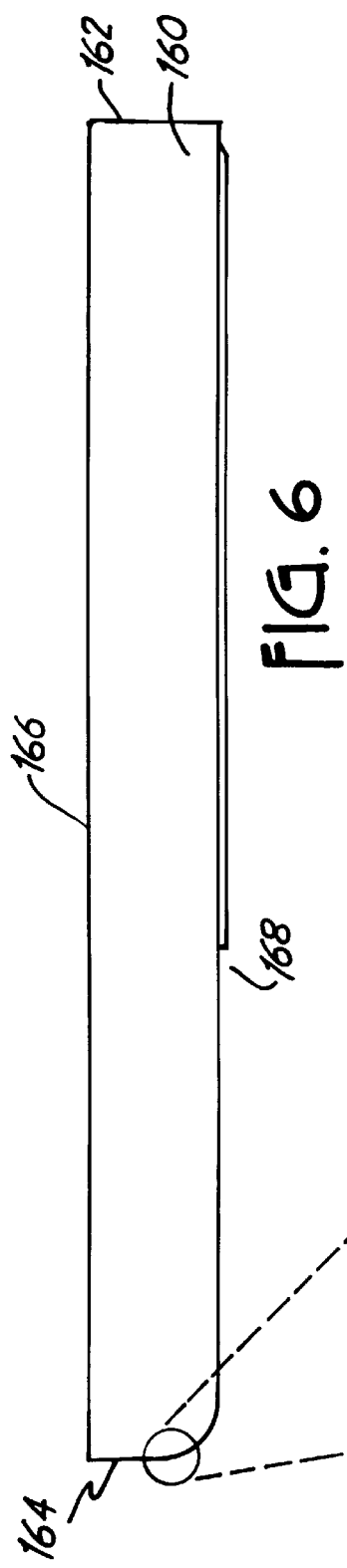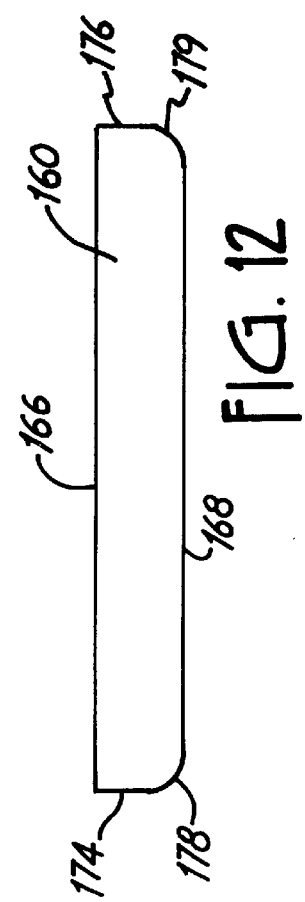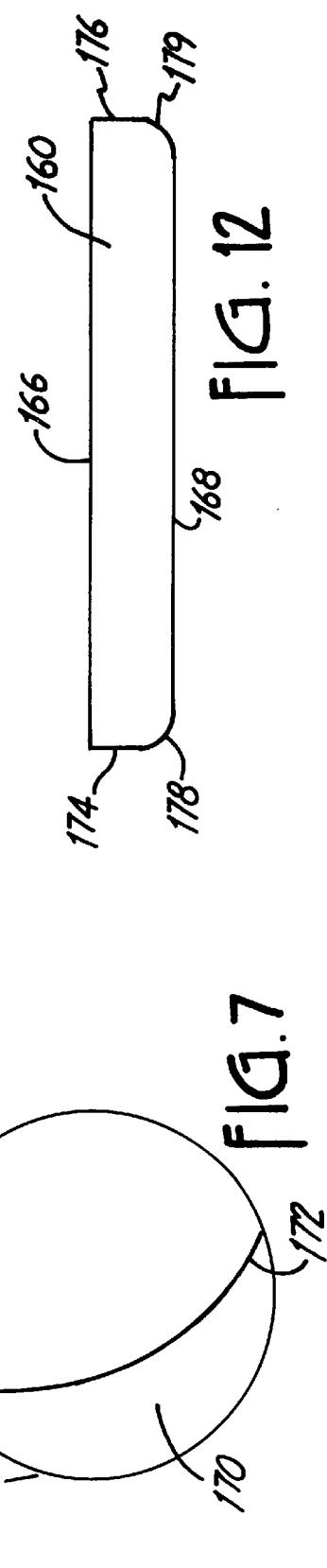

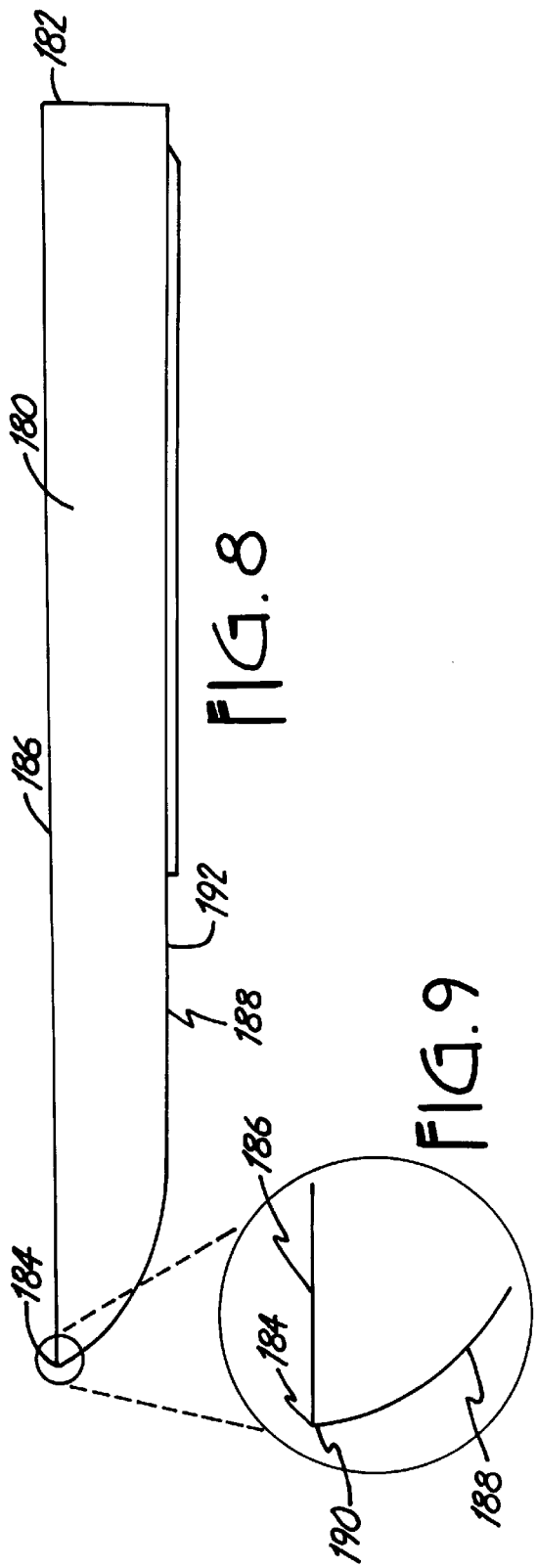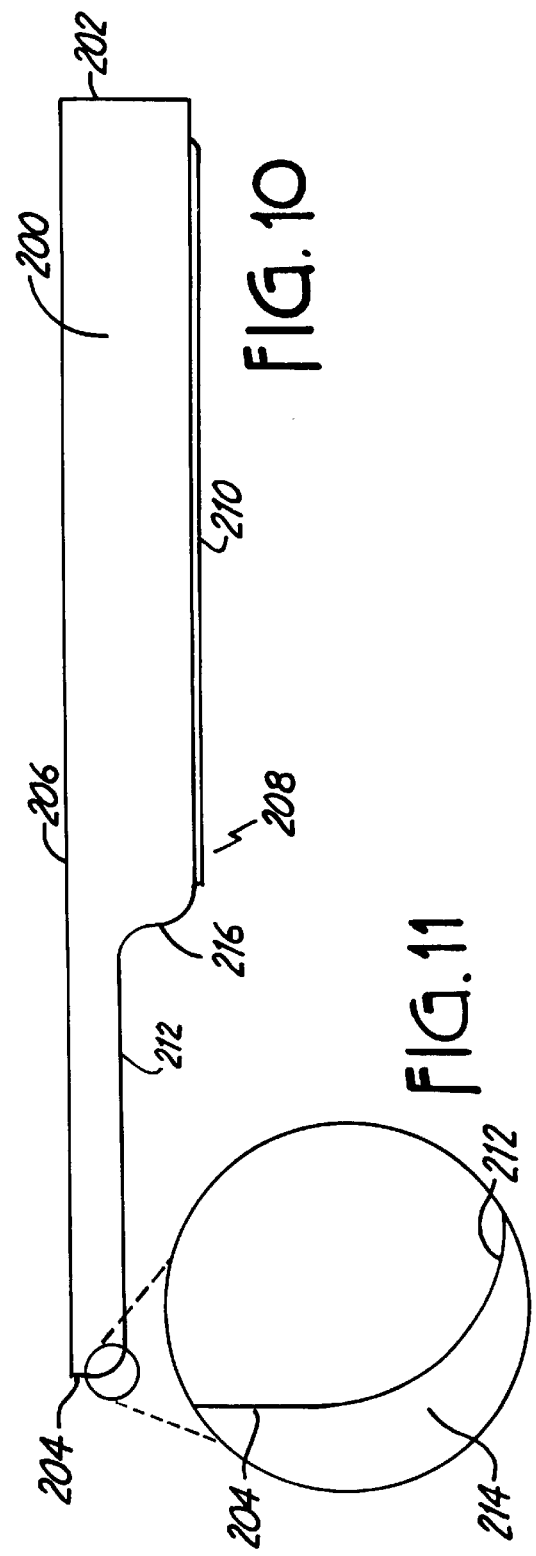

METHOD OF MANUFACTURING ROUNDED EDGE RECORDING HEAD

REFERENCE OF COPENDING APPLICATION

This application claims priority benefits from U.S. Provisional Patent Application 60/069,478 entitled "ROUNDED RECORDING HEADS FOR IMPROVED TRIBOLOGY AND LOAD/UNLOAD PERFORMANCE" filed on Dec. 15, 1997; this application is also a divisional of and claims priority from U.S. Utility application Ser. No. 09/143,752, abandoned, filed Aug. 31, 1998 entitled Rounded Edge Recording Head.

FIELD OF THE INVENTION

The present invention relates to data storage devices. In particular, the present invention relates to recording heads in data storage devices.

BACKGROUND OF THE INVENTION

Data storage devices, such as magnetic, optical, and magneto-optical storage devices, read information stored on a medium by passing a read head close to the surface of the medium in order to sense an attribute of the media. For optical discs, the read head senses pits or depressions in the optical disc using a collimated light source, such as a laser. In magnetic disc drives, the read head senses the direction of localized magnetic moments on the disc.

In order to obtain accurate read data, storage devices typically fly the read head over the surface of the medium so that the read head is extremely close to the surface. This is accomplished by placing the read head on a slider having an air bearing surface that supports the slider and the read head on a cushion of air passing between the slider and the medium. The slider is also supported by an actuator arm, which is connected to the slider through a load beam and gimbal. The actuator arm is further connected to a servo motor that moves the arm and the slider in an arcuate path over the disc to position the head over a desired track.

In many disc drives, the slider and the head are unloaded from the disc when the disc drive is inactive. This typically involves swinging the slider outside of the outer circumference of the disc so that the actuator arm engages a loading ramp. The slider and head are reloaded on to the disc when the drive is reactivated.

During loading, the slider pivots freely on the gimbal and can become unstable as it enters the air stream above the disc. This instability can cause the edges and corners of the slider to impact the disc causing damage to the slider and the disc.

The amount of damage that occurs during impact is determined in part by the shape of the slider. Typically, sliders are created in a batch process that forms large numbers of sliders on a single wafer of material. The individual sliders are cut from the wafer of material along columns and rows. This cutting forms sharp edges and corners along the slider that are susceptible to damage because they form stress concentration points, which tend to fracture when the slider impacts the disc. Furthermore the sharp corners produce large amounts of disc damage when they impact the disc.

In addition, current magneto-optical sliders are prone to disc contact because they have elongated shapes in order to support optical lenses that are mounted on the slider. These elongated shapes bring the trailing edges of the sliders closer to the disc since most sliders fly with a "heads-up" attitude, such that the front edges of the sliders are further from the disc than the trailing edges. Because the trailing edges of current magneto-optical drives are closer to the disc, they are more likely to impact the disc.

SUMMARY OF THE INVENTION

A slider that carries a transducer in a storage device having a moving storage medium, includes a leading end, a trailing end, and a top area extending from the leading end to the trailing end. The top area is designed to face substantially away from the storage medium, while a bottom area of the slider, extending from the leading end to the trailing end, is designed to substantially face toward the storage medium. The bottom area is joined to the trailing end by a curved surface having a substantially constant radius of curvature from the trailing end to a point at least 0.025 millimeters away from the trailing end.

A method of manufacturing sliders of the present invention includes forming a plurality of sliders in a single structural piece with the sliders extending in rows and columns in the single structural piece. The single structural piece is cut along at least one slider boundary using a cutting tool having a curved surface such that a curved edge is formed along at least one slider. The single structural piece is then cut along additional slider boundaries to separate the sliders from each other

BRIEF DESCRIPTION OF THE DRAWINGS

FIG. 2 is a side view of a slider of the prior art.

FIG. 3 is an expanded view of the trailing edge of the slider in FIG. 2.

FIG. 4 is a side view of a slider of the prior art.

FIG. 5 is an expanded view of the trailing edge of the slider of FIG. 4.

FIG. 6 is a side view of an embodiment of a slider of the present invention.

FIG. 7 is an expanded view of the trailing edge of the slider of FIG. 6.

FIG. 8 is a side view of an alternative embodiment of a slider of the present invention.

FIG. 9 is an expanded view of trailing edge of the slider of FIG. 8.

FIG. 10 is a side view of an alternative embodiment of a slider of the present invention.

FIG. 11 is an expanded view of trailing edge of the slider of FIG. 10.

FIG. 12 is a rear view of the slider of FIG. 6.

DETAILED DESCRIPTION OF THE PREFERRED EMBODIMENTS

Figure 1:
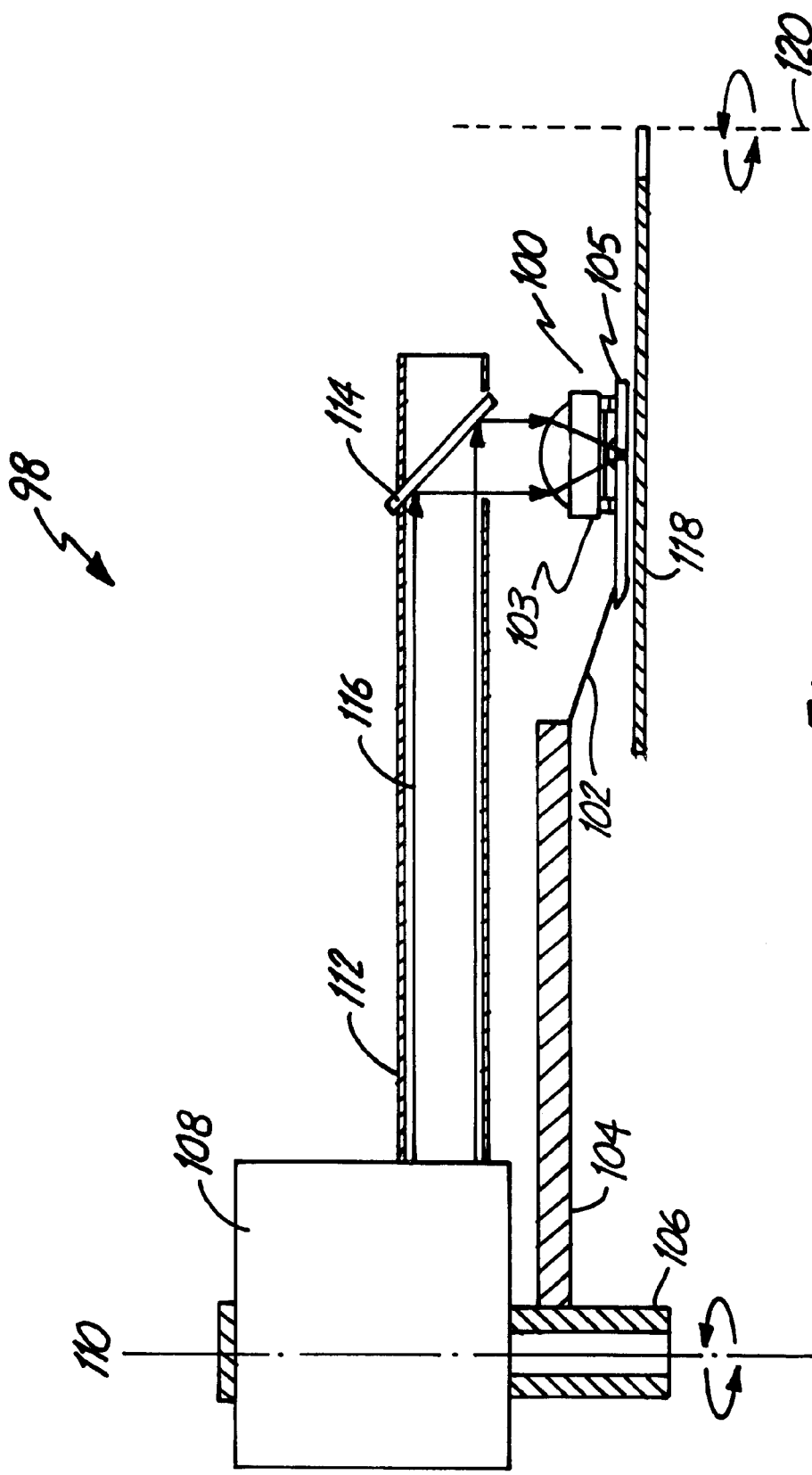
FIG. 1 is a side view of an optical disc drive of the present invention.

FIG. 1 is a side view of an optical storage system 98 providing a general operating environment for the present invention. An optical module 108, which includes a laser, creates a light beam 116 that is directed through an enclosed optical path 112 extending laterally from optical module 108. Light beam 116 reflects off a bending mirror 114 toward an optical head 100, which focuses the beam into a small spot on a disc 118. Disc 118 spins about a central axis 120, continuously bringing new data regions underneath the spot of light produced by optical head 100. The light incident on disc 118 is reflected back through enclosed optical path 112 and is analyzed by a control module attached to optical module 108. Through this process, optical storage system 98 retrieves information stored on disc 118.

Optical head 100 includes lens assembly 103 that is mounted on slider 105. Slider 105 is supported by a suspension assembly 102 that is supported by an arm 104. Arm 104, optical module 108, and enclosed optical path 112 are all supported by a spindle 106, which rotates about a central axis 110. As spindle 106 rotates, head 100 moves to different radial positions across disc 118 and enclosed optical path 112 rotates to remain aligned with optical head 100.

FIG. 2 is a side view of a slider 130 of the prior art having an air bearing surface 132 and a trailing end 134. Air bearing surface 132 is designed to be supported by a cushion of air flowing between the slider and the disc.

FIG. 3 is an expanded view of trailing edge 136 of slider 130. Trailing edge 136 is formed along the juncture where trailing end 134 meets air bearing surface 132. Note that trailing edge 136 is a sharp edge that does not have a constant radius of curvature for any significant distance relative to the length of slider 130 along air bearing surface 132. Such a sharp edge at trailing edge 136 can cause damage to the trailing edge itself and to a disc, if the slider contacts the disc.

FIG. 4 shows another prior art slider 140 having an air-bearing surface 142 and a trailing end 144. Air bearing surface 142 is crowned slightly so that it curves outwardly along its entire length from trailing end 144 to leading end 146.

FIG. 5 is an expanded view of trailing edge 148 of slider 140. Trailing edge 148 is the edge at which trailing end 144 meets air bearing surface 142. Although air bearing surface 142 has a curved face, it produces a sharp edge at trailing edge 148. Specifically, instead of having a constant radius of curvature from air bearing surface 142 to trailing end 144, slider 140 has an extremely short radius of curvature right at the point where trailing end 144 meets air bearing surface 142 and a large radius of curvature along air bearing surface 142. The trailing edge 148 of FIG. 5 is sharp enough that it is susceptible to damage and can cause damage to a disc if the disc and slider make contact.

FIG. 6 is a side view of a slider 160 of the present invention. Slider 160 has a leading end 162, a trailing end 164, a top area 166, and a bottom area 168. Top area 166 extends from leading end 162 to trailing end 164 and is designed to point away from the disc. Bottom area 168 consists of an air bearing surface extending from leading end 162 to trailing end 164.

Bottom area 168 is joined to trailing end 164 at a trailing edge 170 shown in detail in FIG. 7. At the junction between bottom area 168 and trailing end 164, trailing edge 170 as a substantially constant radius curvature that extends for at least 0.025 millimeters from trailing end 164 and preferably remains constant from trailing end 164 to a point on bottom area 168 that is parallel to top area 166. This produces a rounded corner at trailing edge 170 and reduces the damage to the slider and the disc that occurs when slider 160 impacts a disc, such as disc 118 of FIG. 1.

FIG. 8 is a side view of a second embodiment of a slider 180 of the present invention. Slider 180 includes a leading end 182, a trailing end 184, a top area 186, and a bottom area 188. Bottom area 188 provides an air-bearing surface and extends from leading end 182 to trailing end 184.

FIG. 9 is an expanded view of trailing end 184 showing the junction between trailing end 184 and bottom area 188. In FIG. 9, it can be seen that in the embodiment of FIG. 8, trailing end 184 coincides with a trailing edge 190 where bottom area of 188 meets top area 186.

From trailing end 184 in the direction of bottom area 188, slider 180 has a substantially constant radius of curvature for at least a distance of 0.025 millimeters and preferably from trailing edge 184 to a point where bottom area 188 is parallel to top area 186. Such a parallel surface is shown as surface 192 and FIG. 8.

FIG. 10 is a side view of another embodiment of the present invention showing a slider 200 having a leading end 202, a trailing end 204, a top area 206, and a bottom area 208. Top area 206 extends from leading end 202 to trailing end 204 and points away from the storage medium. Bottom area 208 extends from leading end 202 to trailing end 204 and includes an air bearing surface 210 and a recessed surface 212.

Recessed surface 212 is recessed from the disc over which slider 200 flies and is closer to top area 206 relative to air bearing surface 210. Recessed surface 212 joins trailing end 204 at a trailing edge 214 shown in detail in FIG. 11. Trailing edge 214 is a rounded surface such that from trailing end 204, slider 200 has a substantially constant radius of curvature for at least 0.025 millimeters and preferably to a point where recessed surface 212 is parallel with the surface of top area 206.

Between air bearing surface 210 and recessed surface 212, slider 200 has an intermediate face 216 shown in FIG. 10. Intermediate face 216 is preferably joined to air bearing surface 210 through a smooth curved surface having a substantially constant radius of curvature between the two surfaces.

As shown in FIGS. 6–10, in the present invention, the trailing edge of the slider preferably has a constant radius of curvature from the trailing end for distance of at least 0.025 millimeters. In addition, the side edges of the sliders are preferably rounded in a similar manner to produce rounded corners at the trailing edges of the sliders.

FIG. 12 shows a back view of slider 160 showing such rounded side edges. In FIG. 12, top area 166 is joined to bottom area 168 by two side surfaces 174 and 176. Side surfaces 174 and 176 join bottom area 168 through two curved surfaces 178 and 179. Curved surfaces 178 and 179 preferably have a substantially constant radius of curvature from side surfaces 174 and 176, respectively, to a point on bottom surface 168 that is parallel to top surface 166.

Figure 13:
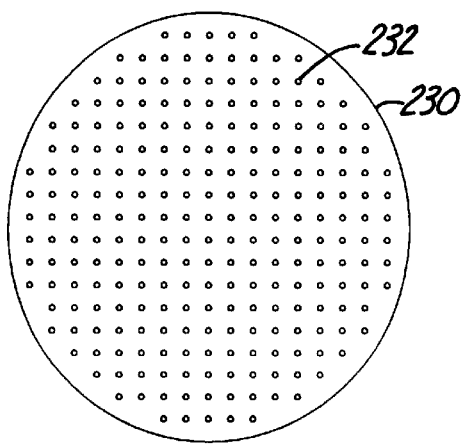
FIG. 13 is a top view of a single structural piece and having multiple sliders form their end.
Figure 14:
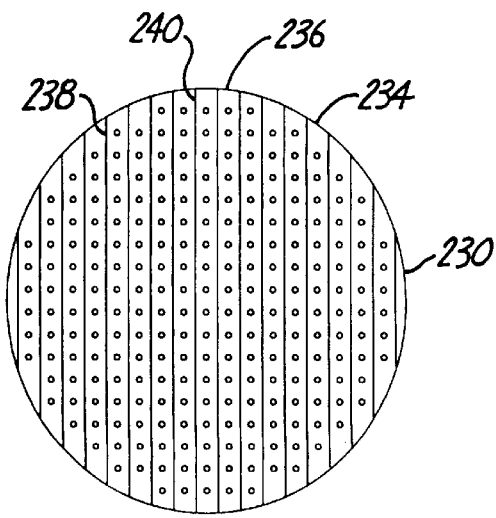
FIG. 14 is a top view of the single structural piece of FIG. 13 with cuts made to separate these sliders into columns.
Figure 15:
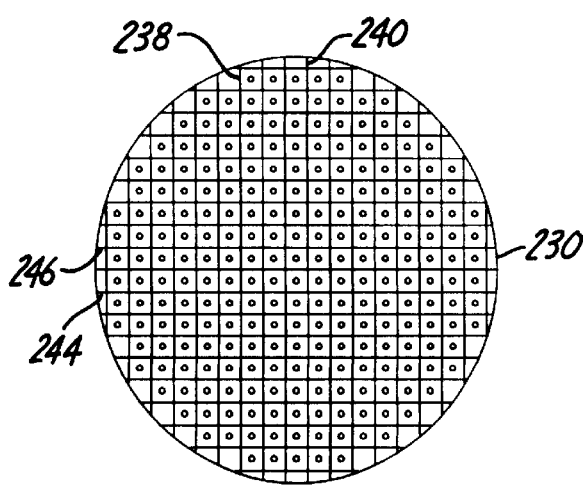
FIG. 15 is a top view of the structural piece of FIG. 14 with additional cuts made to separate the sliders from each other.

FIGS. 13, 14, and 15 show top views of a single piece of material, shaped as a wafer, that are useful in describing the method of manufacturing sliders of the present invention. In FIG. 13, the internal structure of the slider has been fabricated on or in a wafer 230. For optical sliders, this involves creating a mesa, which is a special lens, in the slider. In wafer 230, the mesas, such as mesa 232, are aligned in rows and columns.

In FIG. 14, the sliders of wafer 230 have been cut into columns, for example columns 234 and 236, using a series of collimated cuts, for example cuts 238 and 240. In FIG. 15, the sliders of wafer 230 are completely separated from each other by a series of row cuts such as row cuts 244 and 246.

Figure 16:
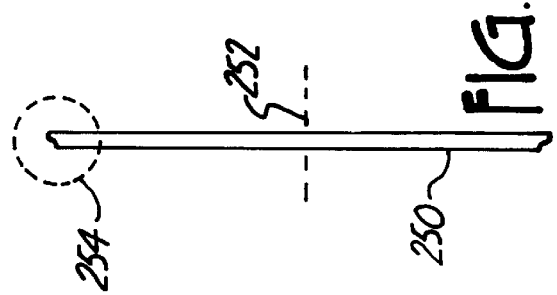
FIG. 16 is a side view of a cutting wheel of the present invention.

In the method of the present invention, the rounded trailing edges of the sliders and the rounded side edges are preferably formed during the cutting process shown in FIGS. 14 and 15. This is preferably accomplished using a shaped diamond studded cutting wheel, such as cutting wheel 250 of FIG. 16. Cutting wheel 250 has an axis of rotation 252 and an outer circumference cutting portion 254. The shape of the outer circumference cutting portion defines the shape of the edges of the slider formed by the cutting wheel.

Figure 17:
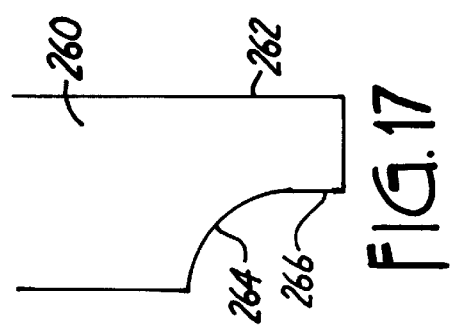
FIG. 17 is an expanded view of a cutting portion of an embodiment of a cutting wheel of the present invention.

For example, FIG. 17 shows the shaped contour of the outer circumference cutting portion of a cutting wheel 260 used to form the leading end 162, trailing end 164, and trailing edge 170 of slider 160 of FIG. 6. The outer circumference cutting portion of FIG. 17 includes a flat face 262 opposite a curved face 264 that is joined to a flat face 266. Flat face 262 forms leading end 162 at the same time that curved face 264 and flat face 266 create trailing edge 170 and trailing end 164 of slider 160 of FIG. 6. Note that the cutting is performed with the bottom area of the slider facing cutting wheel 260. Thus, with a single cut, the outer circumference cutting portion of cutting wheel 260 forms a leading end 162 of one slider and the trailing end 164 and trailing edge 170 of another slider.

Figure 18:
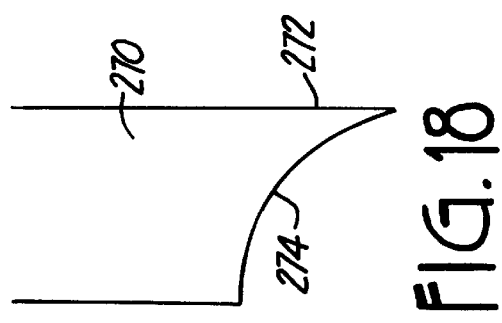
FIG. 18 is an expanded view of a cutting portion of an alternative embodiment of a cutting wheel of the present invention.

FIG. 18 shows a cutting portion 270 of an alternative embodiment of a cutting wheel of the present invention for forming slider 180 of FIG. 8. Cutting portion 270 of FIG. 18 includes flat face 272 and curved face 274. In one cut, flat face 272 defines a leading end 182 of one slider and curved face 274 defines the trailing end 184 and trailing edge 190 of another slider.

Figure 19:
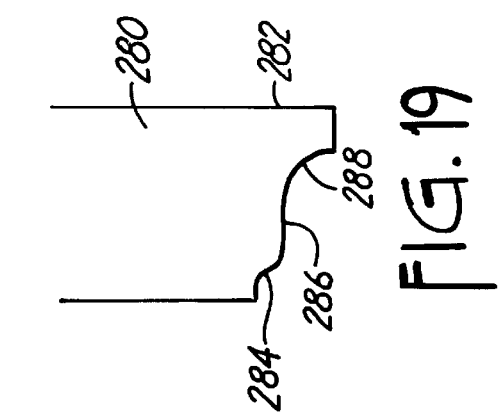
FIG. 19 is an expanded view of a cutting portion of an alternative embodiment of a cutting wheel of the present invention.

FIG. 19 is a cutting portion 280 of an alternative embodiment of a cutting wheel of the present invention. Cutting portion 280 is used to create sliders such as slider 200 of FIG. 10 and includes a flat surface 282 for defining leading ends 202. Cutting portion 280 also includes an intermediate surface 284 for defining intermediate faces such as intermediate face 216 of FIG. 10. A lateral surface 286 of cutting portion 280 defines a recessed surface such as recessed surface 212 of FIG. 10. A curved surface 288 of cutting portion 280 defines a trailing edge 214 of a slider such as slider 200 of FIG. 10.

Since the shapes of the sliders of the present invention are formed during cutting, the shapes do not need to be formed by blending. Blending is a process of the prior art in which sliders are pressed into a resilient member that is covered by a diamond slurry. As the sliders move relative to the slurry, the edges of the slider become slightly rounded. However, the blending process does not provide the degree of rounding found in the present invention and creates several problems, including electrostatic discharge. Thus, by cutting the shapes of the sliders using a cutting wheel, the present invention avoids electrostatic discharge and produces more rounded corners that are less likely to damage the disc.

Figure 20:
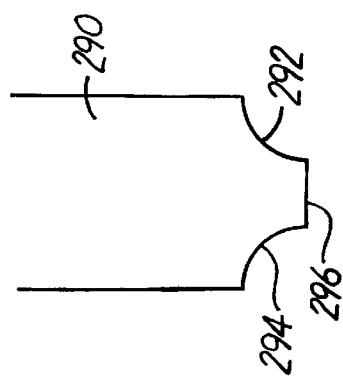
FIG. 20 is an expanded view of a cutting portion of an alternative embodiment of a cutting wheel of the present invention.

To further minimize damage to the disc, as discussed above, the side edges of the slider are also preferably cut so as to have rounded edges. A cutting portion 290 of a cutting wheel of the present invention for cutting the side edges is shown in FIG. 20. Cutting portion 290 includes two curved faces 292 and 294 that are opposite each other and that are joined by a lateral flat surface 296. As the cutting wheel of FIG. 20 cuts between the sliders, it forms rounded side edges on two separate sliders, such as curved surfaces 178 and 179 of FIG. 12.

Although the present invention has been described with reference to preferred embodiments, workers skilled in the art will recognize that changes may be made in form and detail without departing from the spirit and scope of the invention.

What is claimed is:

1. A method of manufacturing sliders for information storage devices, the method comprising:

forming a plurality of sliders connected together at slider boundaries and extending in rows and columns in a single structural piece;

cutting through the entirety of the single structural piece in a single pass along at least one slider boundary using a cutting tool having a curved surface such that a curved edge is formed along at least one slider; and cutting the single structural piece along additional slider boundaries as needed to separate the sliders from each other.

2. The method of claim 1 wherein the curved edge is formed along a trailing edge of a slider.

3. The method of claim 1 wherein the curved edge is formed along a side edge of a slider.

4. The method of claim 1 wherein the cutting tool has two curved surfaces facing in opposite directions such that curved edges are formed on two different sliders as the cutting tool cuts along a slider boundary between the two sliders.

5. A slider formed through the process of claim 1.

6. The slider of claim 5 wherein the slider is formed of an optically transparent material.

7. The slider of claim 5 wherein the slider supports at least one optical lens.

8. A method of manufacturing sliders for information storage devices, the method comprising:

forming a plurality of sliders connected together at slider boundaries and extending in rows and columns in a single structural piece;

cutting the single structural piece along at least one slider boundary using a first cutting tool having a curved surface and a flat surface opposite the curved surface such that a curved edge is formed on at least one slider on one side of the first cutting tool and a planar edge is formed on at least one slider on the opposite side of the first cutting tool; and cutting the single structural piece along additional slider boundaries as needed to separate the sliders from each other.

9. The method of claim 8 wherein the first cutting tool is used to cut along slider boundaries extending in the direction of the rows of sliders, and a second cutting tool is used to cut along slider boundaries extending in the direction of the columns of sliders.

10. The method of claim 9 wherein the second cutting tool has two curved surfaces facing in opposite directions such that curved edges are formed on two different sliders as the cutting tool cuts along a slider boundary between the two sliders.

* * * * *